United States Patent
Meyerzon et al.

(10) Patent No.: US 6,424,966 B1
(45) Date of Patent: Jul. 23, 2002

(54) SYNCHRONIZING CRAWLER WITH NOTIFICATION SOURCE

(75) Inventors: Dmitriy Meyerzon, Bellevue; Sankrant Sanu, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/107,227

(22) Filed: Jun. 30, 1998

(51) Int. Cl.[7] .......................... G06F 17/30; G06F 15/16
(52) U.S. Cl. ............................. 707/3; 707/10; 709/217
(58) Field of Search ............................ 707/1–5, 8, 10, 707/200–204; 709/200–203, 217–219

(56) References Cited

U.S. PATENT DOCUMENTS

| | | | |
|---|---|---|---|
| 5,659,732 A | | 8/1997 | Kirsch ........................... 707/5 |
| 5,748,954 A | | 5/1998 | Mauldin ....................... 707/10 |
| 5,933,604 A | * | 8/1999 | Inakoshi ..................... 709/226 |
| 5,956,722 A | * | 9/1999 | Jacobson et al. ............. 707/10 |
| 5,974,455 A | * | 10/1999 | Monier ....................... 709/223 |
| 5,978,842 A | * | 11/1999 | Noble et al. ................. 709/218 |
| 5,999,940 A | * | 12/1999 | Ranger ........................ 707/103 |
| 6,029,175 A | * | 2/2000 | Chow et al. ................. 707/104 |
| 6,038,610 A | * | 3/2000 | Belfiore et al. ............. 709/300 |
| 6,052,730 A | * | 4/2000 | Felciano et al. ............ 709/225 |
| 6,088,707 A | * | 7/2000 | Bates et al. ................. 707/501 |
| 6,145,003 A | * | 11/2000 | Sanu et al. ................. 709/225 |
| 6,151,624 A | * | 11/2000 | Teare et al. ................. 709/217 |
| 6,182,085 B1 | * | 1/2001 | Eichstaedt et al. .......... 707/104 |
| 6,253,198 B1 | * | 6/2001 | Perkins ........................... 707/3 |
| 6,262,987 B1 | * | 7/2001 | Mogul ......................... 370/400 |
| 6,263,364 B1 | * | 7/2001 | Najork et al. ............... 709/217 |
| 6,301,584 B1 | * | 10/2001 | Ranger ........................ 707/103 |
| 6,351,755 B1 | * | 2/2002 | Najork et al. ............ 707/501.1 |

* cited by examiner

Primary Examiner—Maria N. Von Buhr
(74) Attorney, Agent, or Firm—Christensen O'Connor Johnson Kindness PLLC

(57) ABSTRACT

A method and system for the processing and maintenance of electronic information retrieved from electronic documents stored on a computer network. The gatherer program of the present invention employs a crawler to crawl a portion of the computer network to retrieve electronic documents found during the crawl and that meet a set of crawl restriction rules. Some or all of the data contained in the copies of electronic documents is then stored in a data store such as an index. The invention keeps the data in the data store current by accepting notifications of when a previously retrieved document has changed. The notifications are sent by a notification source that monitors a space containing the previously retrieved documents for changes occurring after the document was last retrieved by the gatherer program. Because the document is being monitored for changes by the notification source, the gatherer program only needs to retrieve the document again when the gatherer program has been notified that the document has changed. If the notification source experiences a discontinuity, such as a system shutdown, the notification source requests that the gatherer perform an initialization crawl to retrieve any documents that changed while the notification source was not operational.

25 Claims, 8 Drawing Sheets

US 6,424,966 B1

SYNCHRONIZING CRAWLER WITH NOTIFICATION SOURCE

FIELD OF THE INVENTION

The present invention relates to software networks and, in particular, to methods and systems for retrieving data from network sites.

BACKGROUND OF THE INVENTION

In recent years, there has been a tremendous proliferation of computers connected to a global network known as the Internet. A "client" computer connected to the Internet can download digital information from "server" computers connected to the Internet. Client application software executing on client computers typically accept commands from a user and obtain data and services by sending requests to server applications running on server computers connected to the Internet. A number of protocols are used to exchange commands and data between computers connected to the Internet. The protocols include the File Transfer Protocol (FTP), the Hypertext Transfer Protocol (HTTP), the Simple Mail Transfer Protocol (SMTP), and the "Gopher" document protocol.

The HTTP protocol is used to access data on the World Wide Web, often referred to as "the Web." The World Wide Web is an information service on the Internet providing documents and links between documents. The World Wide Web is made up of numerous Web sites located around the world that maintain and distribute electronic documents. A Web site may use one or more Web serves computers that store and distribute documents in one of a number of formats including the Hypertext Markup Language (HTML). An HTML document contains text and metadata such as commands providing formating information. HTML documents also include embedded "links" that reference other data or documents located on any Web server computers. The referenced documents may represents text, graphics, or video in respective formats.

A Web browser is a client application or operating system utility that communicates with server computers via FTP, HTTP, and Gopher protocols. Web browsers receive electronic documents from the network and present them to a user. Internet Explorer, available from Microsoft Corporation, Redmond, Wash., is an example of a popular Web browser application.

An intranet is a local area network containing serves and client computers operating in a manner similar to the World Wide Web described above. Typically, all of the computers on an intranet are contained within a company or organization.

Web crawlers are computer programs that "crawl" the World Wide Web in search of documents to retrieve. A Web crawler processes the received data, preparing the data to be subsequently processed by other programs. For example, a Web crawler may use the retrieved data to create an index of documents available over the Internet or an intranet. A "search engine" can later use the index to locate electronic documents that satisfy specified search criteria. However, in order to keep the index current, the Web crawler must periodically return to documents that it has previously retrieved and update the index to reflect any changes made to the document. The interval between the time a document is revised on a Web server and the time until that document is revisited by the Web crawler produces a latency in the index. This latency means that the index may inaccurately reflect a Web document because the document may be modified between the time that a Web document is retrieved and the time that the Web crawler revisits that document. In order to keep the index current, i.e., maintain the latency of the index low, the Web crawler must regularly retrieve Web documents that have been changed.

While all such documents in an index could be checked for changes at regular intervals, this is a time consuming and somewhat inaccurate process. It is inaccurate because Web documents could be modified well before the Web crawler revisits the document to check for changes. It is more desirable to have a mechanism by which a Web crawler only returns to a Web document that it has previously retrieved when there has been a change made to that document. Preferably, such a mechanism would cause the Web crawler to revisit a document only when it has been notified that the document has been changed or when a mechanism monitoring the document has informed the Web crawler that it has experienced a discontinuity. The present invention is directed to providing such a mechanism.

SUMMARY OF THE INVENTION

In accordance with the present invention, a mechanism is provided for maintaining the synchronization between data stored on a computer network and a copy of that data stored in a local data store with minimal latency. The mechanism of the invention initially creates the data stored by performing a "crawl" (recursively following inks, discussed below). The mechanism of the invention then maintains a synchronization between the data stored on the computer network and the copy of the data stored in the local data store by accepting direct notifications from notification sources monitor the data on the computer network that the data has changed. The mechanism of the invention also enables the efficient reestablishment of this synchronization, when necessary, the leveraging the ability of the gatherer to incrementally crawl the data stored on the computer network.

In an actual embodiment of the invention, the gather is an enhanced Web crawler that has one or more configuration entities called gathering projects. Each gathering project has its own transaction log, history map, and crawl restriction rules that a gatherer process uses to "crawl" Web documents that are stored on a plurality of Web servers connected to the World Wide Web. When the gatherer process accesses a document, the gatherer process retrieves a copy of the content of the document, which may include data such as text, images, sound, and embedded properties. The data store preferably is an index that receives and stores the information contained in the copies of retrieved documents. As each Web document is processed, the document's URL and timestamp are stored in a persistent history map. The history map is used in subsequent initialization crawls to revisit documents previously crawled and to retrieve only those documents that have changed since the last time that the gatherer retrieved a copy of the document. The data store is initially created during a first crawl and is undated during subsequent initialization crawls and notification retrievals.

In accordance with further aspects of the present invention, the gatherer process continuously monitors for a notification message sent by a notification source that is registered or listed in the gatherer project. The notification source monitors all or part of the computer network previously crawled by the gatherer process during the first crawl or a subsequent initialization crawl. When the gatherer process receives a notification message from a notification source listed in the gatherer project, the gatherer process places the address of the electronic document contained in the notification message into a notification log. The gatherer process retrieves a copy of an electronic document from each of the addresses listed in the notification log when it is in its notification retrieval mode. The document copy retrieved pursuant to the notification message is then used to update the information associated with the document that is stored in the document data store. A plurality of notification sources can monitor documents and asynchronously send notification messages to the same gatherer process.

In accordance with a still further aspect of the invention, the gatherer process maintains the synchronization between a notification source and the gatherer process by performing an initialization crawl whenever either a listed notification source or the gatherer process experiences a discontinuity such as a system shutdown or network disconnect. If the notification source experiences of discontinuity, the notification source requests that the gatherer process perform an initialization crawl by sending a message to the gatherer process. This initialization message is usually sent to the gatherer process soon after the notification source first starts to run (is instantiated). The gatherer process also performs a initialization crawl when it first begins to run (is instantiated).

The initialization crawl performed by the gatherer process of the present invention is an incremental crawl. The initialization crawl is "seeded" by copying the addresses listed in the history map to the transaction log that the gatherer process uses to retrieve the documents. The gatherer process then selectively retrieves the documents in the transaction log (listed in the history map) and any documents that may be referenced in the documents retrieved. Documents are selectively retrieved if they either are not listed in the history may (discovered during the current crawl), or are listed in the history map and the document has an associated timestamp that is later than the timestamp stored for that document in the history map. The timestamp stored in the history map indicates the timestamp associated with the document the last time the document was retrieved by the gatherer process and is updated every time the document is retrieved. If the respective timestamps match, the current electronic document is considered to by unchanged from the last time the document was retrieved and fed to the data store (index) and is therefore not retrieved during the initialization crawl. Preferably, the comparison of timestamps is performed by sending a request to a server to transfer the current electronic document if the timestamp associated with the current electronic document is more recent than a timestamp included in the request.

When a document copy is retrieved, the copy of the electronic document is used to update the data store. This synchronizes the information associated with the document in the data store to current information associated with the electronic document as it is stored on the computer network. By performing this synchronization whenever the notification source or the gatherer starts up, any changes to the electronic documents that may have been missed by the notification source while it was not operating, or not received by the gatherer while the gatherer was not operating, are accounted for.

As will be readily appreciated from the foregoing description, the present invention relieves the gatherer process of the need to make periodic crawls to discover if already retrieved electronic documents have changed as long as the synchronization enabled by the mechanism of the invention is maintained or can be reestablished. Instead, the gatherer process retrieves only those documents that it has been notified have changed and only needs to perform an initialization crawl when a notification source or the gatherer has ceased to operate for a period of time. The ability of the gatherer process to perform an initialization crawl means that the notification source does not used to account for events that took place during its discontinuity—it need only send a message to the gatherer to reinitialize the synchronization by performing an initialization crawl to pick up any changes that the notification source might have missed. This allows for simplified notification sources, reduces the requirements and complexity of the notification source, and leverages the existing ability of the gatherer process to perform enumeration of the computer network.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
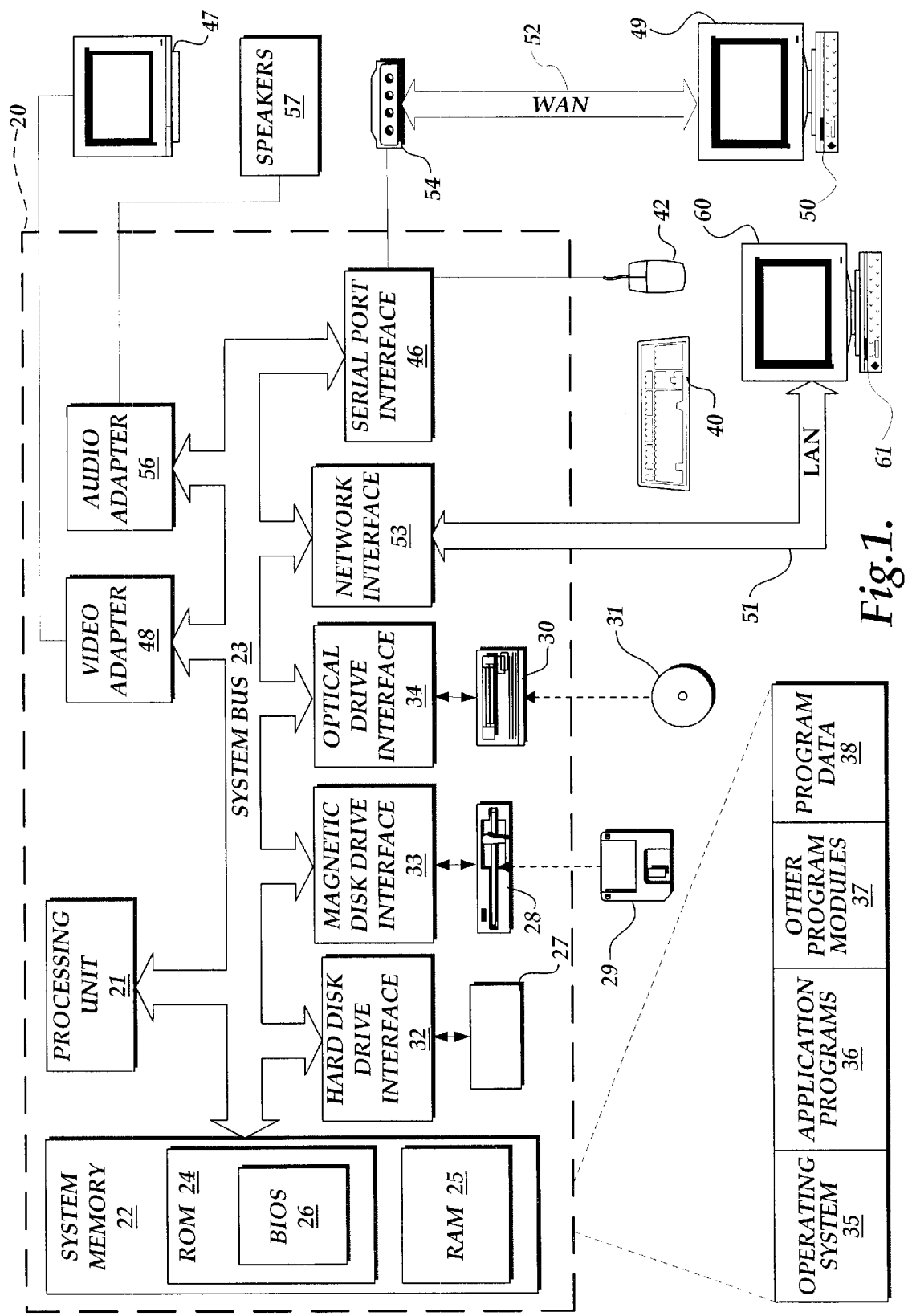
FIG. 1 is a block diagram of a general-purpose computer system for implementing the present invention.

The present invention is a mechanism for obtaining and processing information pertaining to documents that reside on one or more server computers connected to a computer network. While the invention may be employed on any computer network, or even an individual computer, it is convenient to describe the invention as it operates in an actual embodiment on the World Wide Web (the "Web"). A server computer is referred to as a Web site, and the process of locating and retrieving digital data from Web sites is referred to as "Web crawling." In accordance with the present invention, the computer program performing the Web crawling is called a gatherer process. The gatherer process retrieves Web documents by visiting the Uniform Resource Locators (URLs) associated with Web documents that have been placed in a queue referred to as a transaction log. The gatherer process recursively retrieves document URLs referenced by hyperlinks in the documents that it visits and inserts those URLs into the transaction log so that they also will be visited by the gatherer process during the current Web crawl. A URL can be thought of as an address on a network, such as the Internet, where the Web document is located. If the gatherer is able to retrieve the Web document at the URL listed in the transaction log, the document data is retrieved, processed and persistently stored by one or more of the gatherer's client applications. As used herein, the term Web document refers to all data resources available to the gatherer during the Web crawl. Examples of these data resources include files, HTML documents, database entries, mail messages and meta-documents such as file system directories and mail folders.

In accordance with the present invention, a configuration entity called a gatherer project is defined that specifies a set of crawl restriction rules that limit the scope of the Web that will be crawled. Each gatherer project has its own transaction log, notification log, and history map that are used by the gatherer process to crawl the Web, create a data store from the documents retrieved during the first crawl, and then maintain the accuracy of the data store by receiving notifications from external notifications sources that contain one or more URLs of documents that have changed since they were has retrieved any by conducting initialization crawls, discussed in detail below.

Using the configuration found in the gatherer project, the gatherer process initially performs a first crawl wherein all documents n a transaction log are retrieved when the gatherer process visits the Web sites on which the documents are stored. The data from each retrieved document is processed by a client application and stored in a data store, such as an index or other database. As each Web document is processed, the document's URL and timestamp are stored in a persistent history map. The history map may be used in subsequent initialization crawls to minimize the retrieval of documents that the gatherer process has previously crawled and that have not changed since the previous crawl.

In accordance with the invention, notification that a document has changed or a new document has been added is sent by a notification source that monitors a scope, or area on the computer networks such as a folder, containing all or a portion of the Web documents retrieved during the first crawl. As long as the notification source guarantees to recognize changes made to the document from the time the last initialization crawl was started and then to send a notification message to the gatherer process when it discovers a change, and the gatherer guarantees that it will retrieve and process the document referenced in the notification, the data store will remain synchronized with the current information contained in the document stored on the computer network with minimal latency. The invention provides a mechanism to reestablish this synchronization when there is a discontinuity between the time the document is retrieved by the gatherer process in a first or initialization crawl and the period in which the notification source monitors the document. In accordance with the invention, this synchronization is established or reestablished when the gather process performs an initialization crawl. The initialization crawl is performed by the gatherer process when it is first started or whenever it receives a message from a notification source that the notification source has just started (or restarted) to monitor the documents. The initialization crawl is discussed in detail below.

During a notification retrieval mode that follows the initialization crawl, the gatherer process receives the notification messages sent by the notification sources and places the URLs listed in the notification messages into a notification log. When the initialization crawl is completed, the gatherer process enters a notification retrieval mode, wherein in response to the notification message, the gatherer process retrieves the documents at the URLs listed in the notification log so that the changed document will be gathered and promptly incorporated into the data store to minimize the latency of its stored data.

In addition to accepting notifications during the notification retrieval mode, the gatherer accepts notifications and writes them into the notification log while the initialization crawl is in progress. This guarantees that all changes that occurred between the time the initialization crawl starts and finishes will be processed during the notification retrieval mode. When the notification source sends the initialization message that starts the initialization crawl, the notification source begins monitoring the documents and will send a notification message when a document has changed even if the gatherer is still performing an initialization crawl. This is advantageous because thee is no guarantee of when during the initialization crawl that the gatherer will check a particular document, so a change could occur after the gatherer has checked a document but before it finishes the initialization crawl. Alternatively, the gatherer could detect the change and receive a notification from the notification source. This means that in some cases, the gatherer may get a false notification saying that the document has changed when it actually has not. The false notification is discovered when the gatherer checks the time stamp of the document during the notification retrieval mode.

Gatherer and notification source programs execute on a computer, preferably a general-purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. hat perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are inked through a communications network. In a distributed competing environment, program modules may be located in both local and remote memory storage devices.

With reference to FIG. 1, an exemplary system for implementing the invention includes a general purpose computing device in the from of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RMA) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removal optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user only enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. One or more speakers 57 are also connected to the system bus 23 via an interface, such as an audio adapter 56. In addition to the monitor and speakers, personal computers typically include other peripheral output devices (not shown), such as printers.

The personal computer 20 operates in a networked environment using logical connections to one or more remote computers, such as remote computers 49 and 60. Each remote computer 49 or 60 may be another personal computer, a server, a router, a network PC, a pear device or other common network node, and typically includes many or all of the elements described above relative to the personal computer 20, although only a memory storage device 50 or 61 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet. As depicted in FIG. 1, the remote computer 60 communicates with the personal computer 20 via the local area network 51. The remote computer 49 communicates with the personal computer 20 via the wide area network 52.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
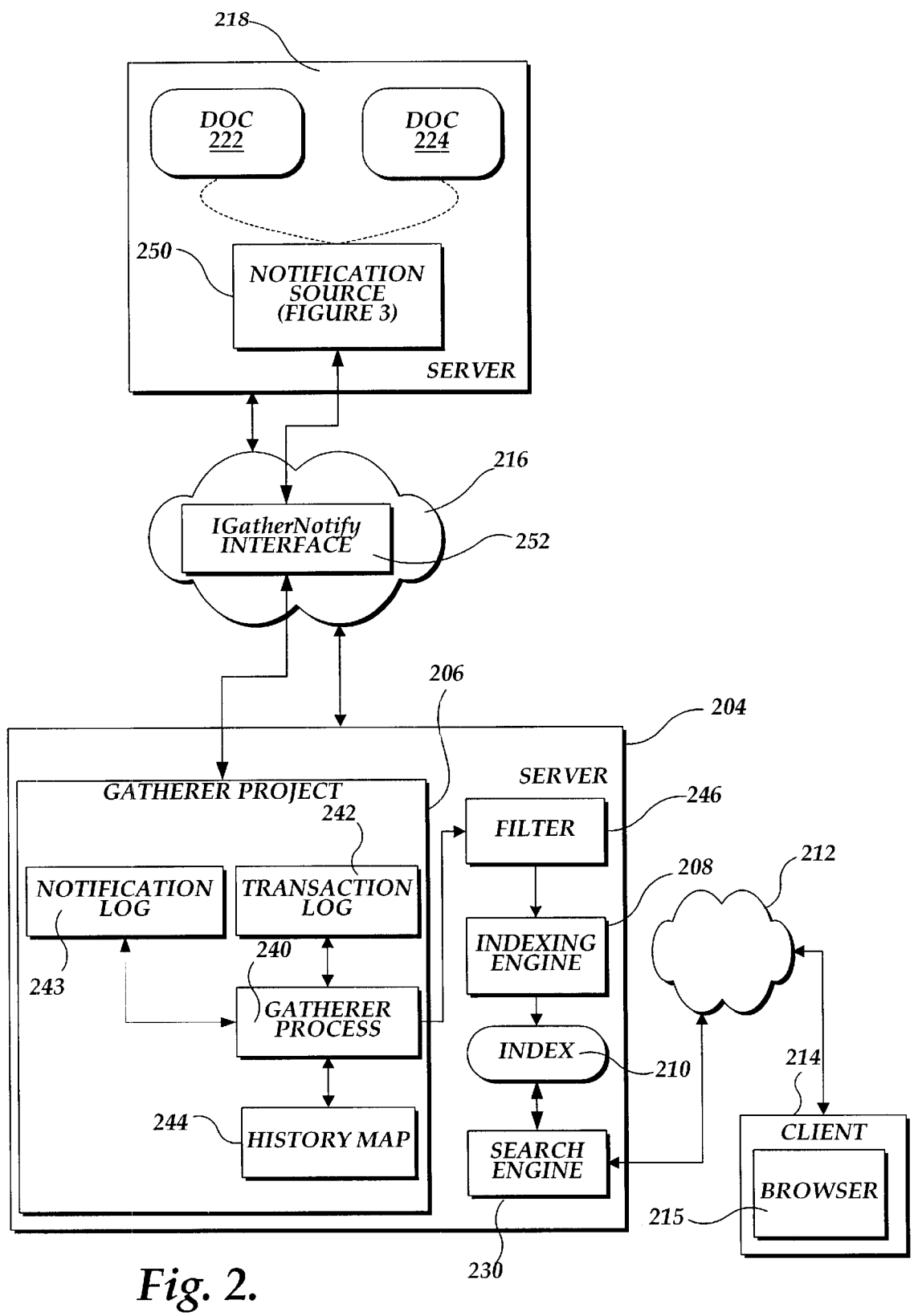
FIG. 2 is a block illustrating a network architecture, in accordance with the present invention.

FIG. 2 illustrates an exemplary architecture of a networked system in which the present invention operates. The computer network 216 may be a local area network 51 (FIG. 1), a wide area network 52 (FIG. 1), or a combination of networks that allow the server computer 204 to communicate with remote-computers, such as the remote server computer 218, either directly or indirectly. The server computer 204 and the remote server computer 218 are preferably similar to the personal computer 20 depicted in FIG. 1 and discussed above.

The server computer 204 includes a gatherer process 240 executing thereon. The gatherer process 240 is an improved Web crawler that incorporates the extended functionality of the present invention. The gatherer process 240 searches for electronic documents distributed on one or more computers connected to a computer network 216, such as the remote server computer 218 or the local server 204 depicted in FIG. 2. The gatherer process 240 searches remote server computes 218 connected to the network 216 for electronic documents 222 and 224 and passes the collected data to an application such as an indexing engine 208. The indexing engine 208 creates a data store such as an index 210. Those skilled in the art will appreciated that the present invention is not limited to applications that create a data store 210 such as a index, but may include any application that would benefit from having access to current information contained in Web documents. An index, however, is a convenient example to illustrates a use of the present invention and will be used in the following discussion without intending to limit the scope of the present invention.

The index 210 is similar to the index in a book, and contains reference information and pointers of electronic documents to which the reference information applies. For example, the index may include keyboards, and for each keyboard a list of addresses. Each address can be used to locate a Web document that includes the keyword. The index may also include information other than keywords used within the electronic documents. For example, the index 210 may include subject headings or category names, even when the literal subject heading or category name is not included within the electronic document. The type of information stored in the index depends upon the complexity of the indexing engine, which have the capability of analyzing the contents of the electronic document and storing the results of the analysis.

A client computer 214, such as the personal computer 20 (FIG. 1), is connected to the server computer 204 by a computer network 212. The computer network 212 may be a local area network, a wide area network, or a combination of networks. The computer network 212 may be the same network as the computer network 216 or a different network. The client computer 214 includes a computer program, such as a "browse" 215 that locates and displays documents to a user.

When a user at the client computer 214 desires to search for one or more electronic documents, the client computer transmits data to a search engine 230, located in the server computer 204, requesting a search. In response to the search request, the search engine 230 examines its associated index 210 to find documents that correspond to the search request and, thus, may be of interest to the user. The search engine 230 returns a list of such documents to the browser 215 at the client computer 214. The user then examines the list of documents and, if any are of interest, requests that one or more desired documents be electronically retrieved from remote computes such as the remote server computer 218.

The gatherer process 240 performs crawling of the Web and gathering of electronic documents. As generally illustrated in FIG. 2, the gatherer process 240 iterates through a transaction log 242 containing the URLs of the documents that the gatherer process 240 will gather. As is known to those skilled in the art, web crawls may also be limited to specific crawl parameters that define, for instance, the type of web documents to be crawled. When the invention is practiced in a multithreaded operating system, multiple gatherer processes 240 may concurrently process the URLs from the transaction log 242 by operating within different threads allocated from a common thread pool.

The initial crawl conducted by the present invention is a first crawl (illustrated in FIG. 5A and described in more detail below). In a first crawl, a new transaction log 242, notification log 243, history map 244, and index 210 are created. The transaction log 242 is seeded by passing it one or more starting URLs. The starting URLs are referred to as seeds because the gatherer process 240 recursively processes gathered. Web documents by searching the Web document data for references to "linked" Web documents. A URL can be a universal naming convention (UNC) directory, a UNC path to a file, or an HTTP path to a file. The gatherer process 240 inserts the linked URLs into the transaction log 242, which maintains a list of URLs that are currently being processed or have not yet been processed. The transaction log 242 functions as a queue. It is called a log because it is preferably implemented as a persistent queue that is written and kept in a nonvolatile storage device such as a disk to enable recovery after a system failure. Preferably, the transaction log 242 maintains a small in-memory cache for quick access by the gatherer 240 to the next several transactions.

The gatherer process 240 also maintains a history map 244, which contains an ongoing list of all URLs that are retrieved by the gatherer process 240. As mentioned above, the gatherer process 240 includes one or more worker threads that process each URL in the transaction log 242. Each worker thread retrieves a URL from the transaction log 242, processes the URL as described above, and then continues to retrieve and process URLs until there are none left in the transaction log 242. Preferably, once a transaction log entry is processed by a worker thread, the entry is marked as having been processed, in order to assist recovery from a system failure. The number of worker threads may depend upon the configuration and available resources of the computer system.

The gatherer process 240 retrieves a URL from the transaction log 242 and passes the URL to a filtering process 246. The filtering process 246 is a process that uses the URL to retrieve the electronic document at the address specified by the URL. The filtering process 246 uses the access method specified by the URL to retrieve the electronic document. For example, if the access method is HTTP based, the filtering process 246 uses HTTP commands to retrieve the document. If the access method specified is FILE, the filtering process uses file system commands to retrieve the corresponding documents. The File Transfer Protocol (FTP) is another other well known access method that the filtering process 246 may use to retrieve a document. Other access protocols may also be used in conjunction with the invention.

Preferably, each server 218 runs at least one instance of a notification source 250. In general, the notification source 250 (illustrated in FIG. 3 and described in detail below) is an intermediate agent running on the remote sever 218 that monitors the Web documents 222, 224 on the sever 218 for changes. When the notification source 250 detects a change in a Web document, e.g. document 222, it sends a notification message to the gatherer process 240 through an IGatherNotify interface 252 that is visible in a distributed namespace supported by the computer network 216 (discussed below). When the gatherer process 240 receives the notification message from a notification source 250 that it is interested in, it adds the URL of the changed Web document contained in the notification message to a notification log 243 so that it will be retrieved when the gatherer process enters a notification retrieval mode (FIG. 6), which is described below in detail.

As will be readily understood by those skilled in the art of computer network systems, and others, the system illustrated in FIG. 2 is exemplary, and alternative configurations may also be used in accordance with the invention. For example, the server computer 204 itself may include electronic documents and a notification source that are accessed by the gatherer process 240. The electronic documents on this server 204 may be monitored by a local instance of a notification source or by an instance of a notification source 250 located on another server computer 218. The gatherer process 240, the indexing engine 208 and the search engine 230 may also reside on different computers. Additionally, the Web browser program and the gatherer process 240 may reside on a single computer. As discussed above, the client computer 214, the server computer 204, and the remote server computer 218 may communicate through any type of communication network or communications medium.

Figure 3:
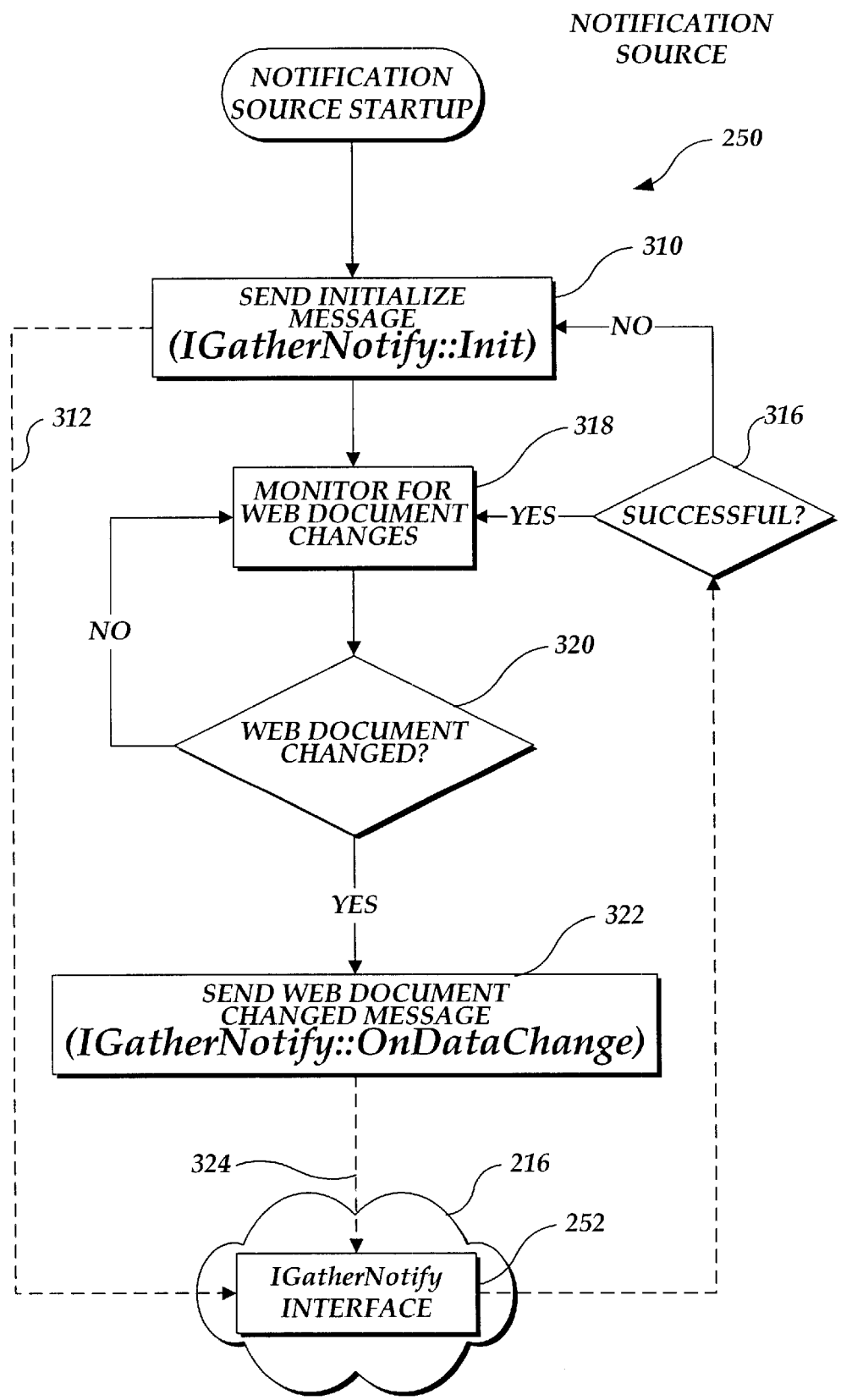
FIG. 3 is a functional flow diagram illustrating a notification source, in accordance with the present invention.

A notification source 250 formed in accordance with the present invention is shown in FIG. 3. The notification source 250 is an intelligent server-side agent that is responsible for sending notifications to the gatherer process 240 when a monitored Web document 222 or 224 changes. The notification source 250 is also responsible for requesting an initialization crawl (FIG. 5b) whenever the notification source 250 first starts or experiences a discontinuity such as a system shutdown. This relieves the notification source 250 of the need to determine if it has missed changes during its discontinously—which can be difficult to implement. Instead, the invention allows the notification source 250 to leverage the gatherer's ability to crawl the documents when synchronization is required. The notification source may be a third party implementation as long as it guarantees to monitor the documents as long as it runs, to request an initialization crawl soon after the notification source begins to run, and communicates with the gatherer as defined by the IGatherNotify interface.

Information corresponding to documents stored in the index 210 is defined as synchronized with the documents stored on the related server when all pending notification messages associated with the documents have been processed by the gatherer. Ideal synchronization requires the notification source 250 notify the gatherer process 240 as soon as any document 222 is charged. The gatherer process 240 should then immediately retrieve the changed document 222 and instantly synchronize the newly gathered information from the Web document 222 with information pertaining to the same document 222 that is contained in the data store 210. However, inherent limitations in computing resources usually mean that there will be a sight lag between the time that the Web document 222 changes and when the gatherer process 240 actually gathers the changed document 222 and synchronizes the modified information with the index 210.

As mentioned above, the present invention recognizes the lag caused by the inherent limitation in computing resources by defining Web document information stored in the data store as synchronized with the related Web document stored in the related server when all pending notifications associated with the Web document have been processed by the gatherer. These pending notification messages are stored by the gatherer process 240 in a notification log 243. Synchronization is maintained as long as the notification source 250 guarantees that it will not miss any changes that occur in the Web documents 222, 224, and the gatherer process 240 guarantees that the notification will be processed as soon as is possible.

Synchronization can be lost if either the notification source 250 or the gatherer process 240 ceases operation, such as during a system failure or other shutdown. If the gatherer process 240 stops running, it may miss notification messages sent by notification sources and it may or may not maintain the list of notification that it has received but not yet processed. Similarly, the notification source 250 may or may not maintain a list of notifications that it has detected but not yet forwarded to the gatherer process 240. Also, the notification source 250 will not send the required notification messages when the notification source is not running. To address the problem of the notifications being lost before they are processed, or not being sent when they should have been because of some error in the notification source 250, the present invention provides the method and system for maintaining synchronization. The notification source's responsibility is shown in the functional flow form in FIG. 3. FIG. 3 also shows the method and system that monitors the Web documents 222 and 224 for changes and issues a notification when a change has been detected.

Synchronization is initiated when the notification source 250 is started-up. At start-up, the notification source 250 generates an initialize message (IGatherNotify::Init, discussed below). See block 310. The initialize message travels to the gatherer process 240 as an external initialize function call 312. The initialize function call 312 is received by a gatherer object supporting the IGatherNotify interface, which is described below. Preferably, all function calls cause the object supporting the IGatherNotify Interface to return a message indicating if the function call was successful or not. A report by the gatherer process 240, by way of return message 314, that the gatherer process 240 successfully started an initialization crawl is detected in a decision block 316. When this occurs, the notification source 250 begins to monitor for changes to Web documents 222 or 224. See block 318. The notification source may monitor one or more Web documents 222, 224, which are within a scope that the notification source 250 monitors.

A notification source is a program that is able to monitor a set of documents and send notifications to the IGatherNotify interface when a change to any document occurs. As mentioned above, this notification source 250 may be developed by the users of the gatherer 240 and deployed by the web master or system administrator of a Web site or other computer connected to a computer network. Typically, the notification source 250 will monitor changes on the file system in the corresponding Web server (all web documents are eventually scored as separate files in the file system of the host computer). There are public mechanisms available for accepting file notification from the file systems that the notification source 250 can use to detect changes to documents. The administrator of the notification source 250 configures the notification source 250 with the location of the computer that the gatherer process 240 is running on and the name string (notification source identification) to use when invoking the IGatherNotify::Init function crawl. Correspondingly, the administrator of the gatherer process 240 configures the gatherer project 206 to accept notifications from the notification source 250 identified by a name string listed in the gatherer project 206. It is possible to configure the gatherer project 206 to accept notifications from multiple notification sources, as well as forward notifications from the same notification source to multiple projects. Because the notification source 250 is not part of the gatherer process 240, it can be developed and deployed by a third party or an ISP (independent service provider) after the gatherer is deployed. The third party is not limited to the form of how the notification source is deployed—applet, service, script, because the gatherer process 240 is only interested in the messages sent by the notification source.

The file systems of the various servers usually provide file change notifications at a folder level, in other words, a notification source can register itself with the root of the file system volume, and the file system will notify it when any file in the volume has changed (added, deleted, modified). Similarly, mail message stores provide notifications when new mail is received (deleted, changed) at the folder or mailbox level. A SQL server also usually has trigger mechanism that can be utilized to implement a notification source 250. A SQL Server trigger is a procedure that is called whenever a record in a database is changed.

The monitoring of the Web documents 222 and 224 by the notification source is conducted in a logical polling comprising block 318 and decision block 320 Preferably, the logical polling does not use any system resources while waiting for changes in the system it is monitoring. When the notification source 250 detects that a change has been made to a Web document, the notification source generates a document change message (IGatherNotify::OnDataChange). See block 322. The document change message is sent to the gatherer process 240 as an external document change function call 324.

Figure 4:
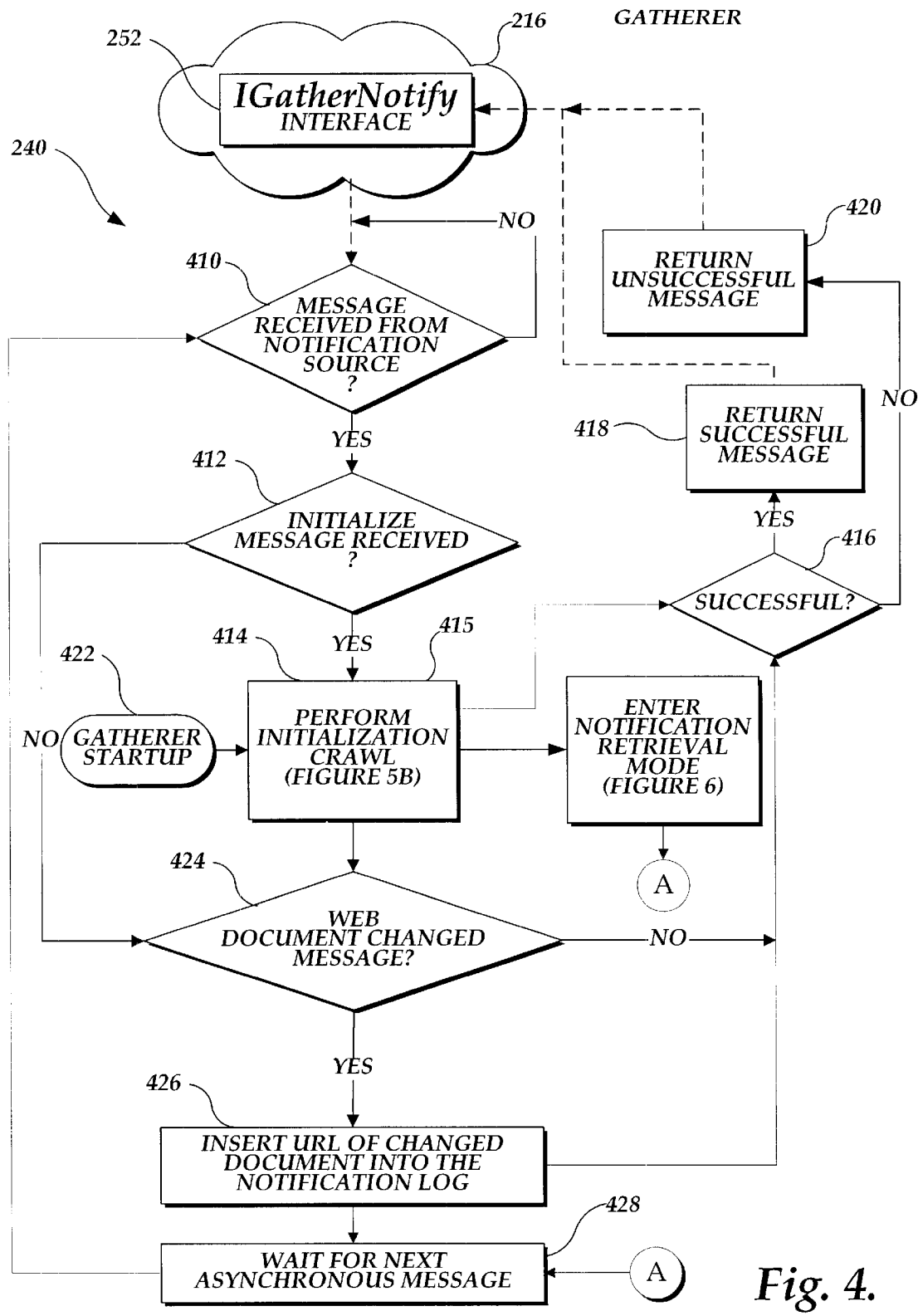
FIG. 4 is a functional flow diagram illustrating a gatherer process, in accordance with the present invention.

The gatherer project's 206 response to the initialize function call 312 and the document change function call 324 is shown in FIG. 4. The gatherer process 240 idles in a decision block 410 until the gatherer process 240 receives a message from one or more notification source 250. The idling is a synchronous in that the gatherer process 240 may perform other tasks such as Web crawls while waiting for messages from a notification source 250. When a message is received from a notification source 250, the gatherer process 240 determines if the message is an initialize message 310. See black 412. If the message is an initialize message 310, in block 414, the gatherer process 240 performs an initialization crawl (shown in FIG. 5B and described below). The start of a successful initialization crawl is detected in a decision block 416 and a "successful" message, created in a block 418, is returned to the notification source 250 trough the IGatherNotify interface. If the initialization crawl was not started successfully, an "unsuccessful" message, created in a block 420, is returned to the notification source 250. An initialization crawl can be performed when the gatherer first starts up (block 422). As discussed above and in further detail below, the initialization crawl initiates the synchronization between the notification source 250 and the gatherer process 240 and between the Web documents 222, 224 and the projects index 210.

If the message received by the gatherer process 240 from a notification source 250 is a document change message 322 control transfers from the initialize message received decision block 412 to a Web document changed decision block 424. The Web document changed decision block 424 determines if the message received from the notification source was a document changed message 322. If the message is unrecognized at the Web document changed message decision block 424, the function call is reported unsuccessful to the notification source 250 through successful decision block 416 and the return unsuccessful message block 420. If the Web document changed message decision block 424 determines that the gatherer process 240 has received a document change message 322, the URl of the changed Web document 222 is inserted into the notification log 243 in a block 426 and the insertion is reported as successful to the notification source 250 through the successful decision block 416 and the return successful message block 418. The URL placed into the notification log 243 is retrieved by the gatherer process 240 after the process enters the notification retrieval mode. See block 415. The notification retrieval mode is illustrated in FIG. 6 and described below.

Figure 5B:
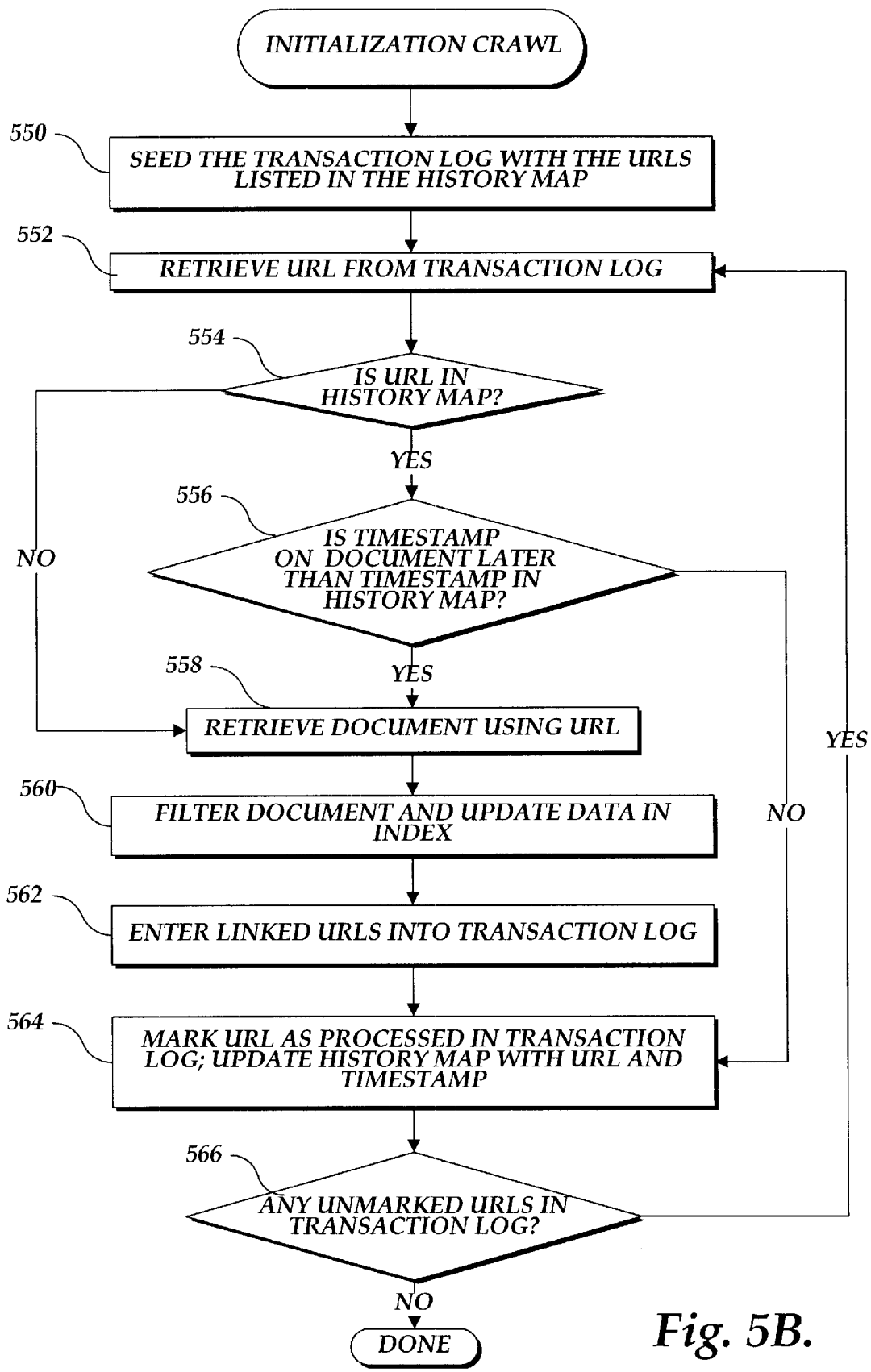
Figure 6:
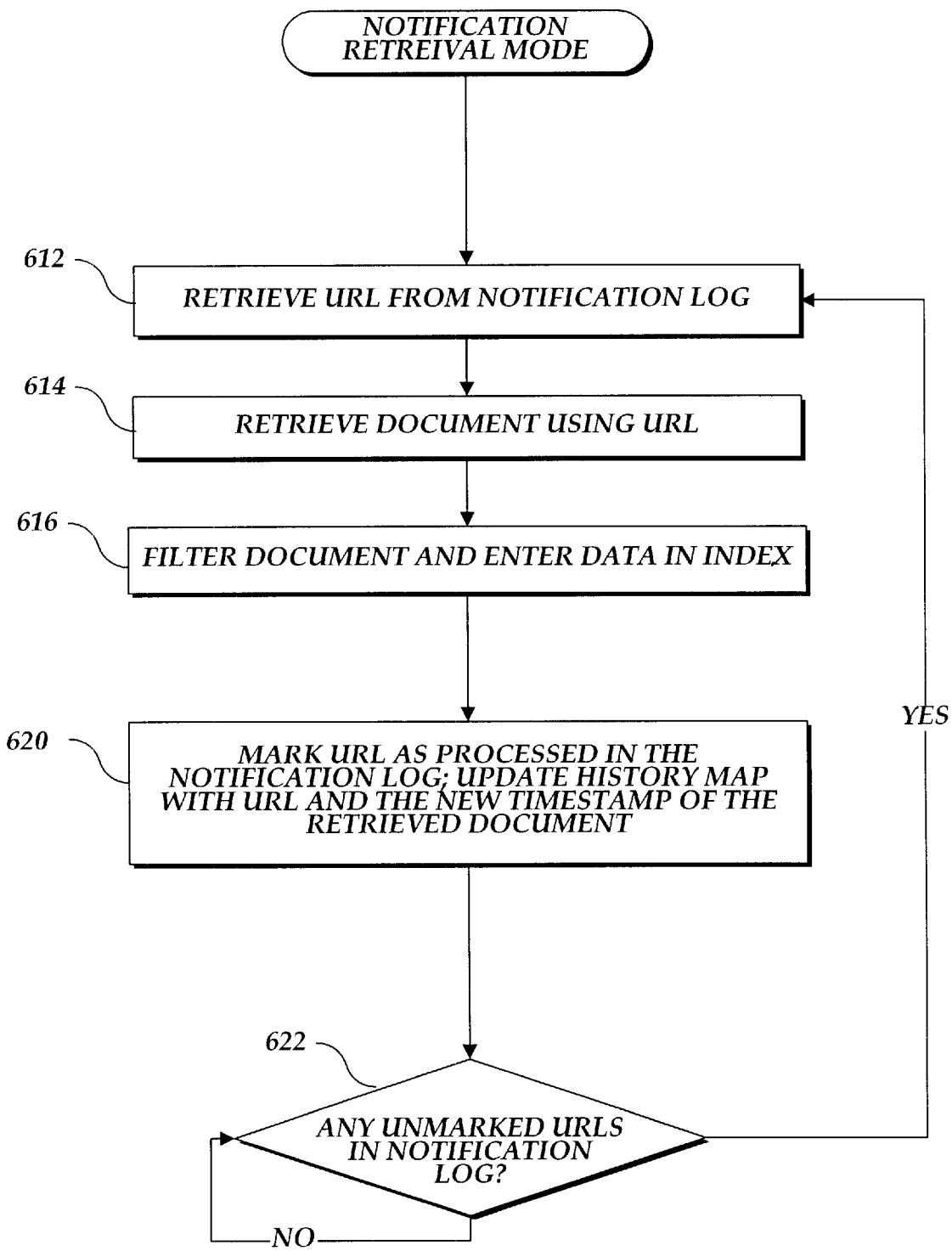
FIG. 6 is a functional flow diagram illustrating a notification retrieval mode implemented by the gatherer process in accordance with the present invention.

Document change messages 322 are processed by the gatherer process 240 during both the initialization crawl (FIG. 5B) and during the notification retrieval mode (FIG. 6). See block 428. As mentioned above, logging the notification messages in the notification log 243 during the initialization crawl (FIG. 5B), guarantees that all changes to the monitored documents that occur between the time the initialization crawl starts and finishes will be processed in the notification retrieval mode (FIG. 6). During the initialization crawl, a notification message will be sent to the gatherer and logged in the notification log whenever a document changes. If this notification message was generated after the gatherer retrieved the document in the current initialization crawl, then the document needs to retrieve the document in the notification retrieval mode. If the notification message was generated after the start of the initialization crawl but before the document was retrieved, there may be no need to retrieve the document during the notification retrieval mode. This "false" notification message, although logged in the notification log 243, will be accounted for when the gatherer checks the document's time stamp before retrieving it. The checking of the document's time stamp is discussed below (FIG. 5B).

Figure 5A:
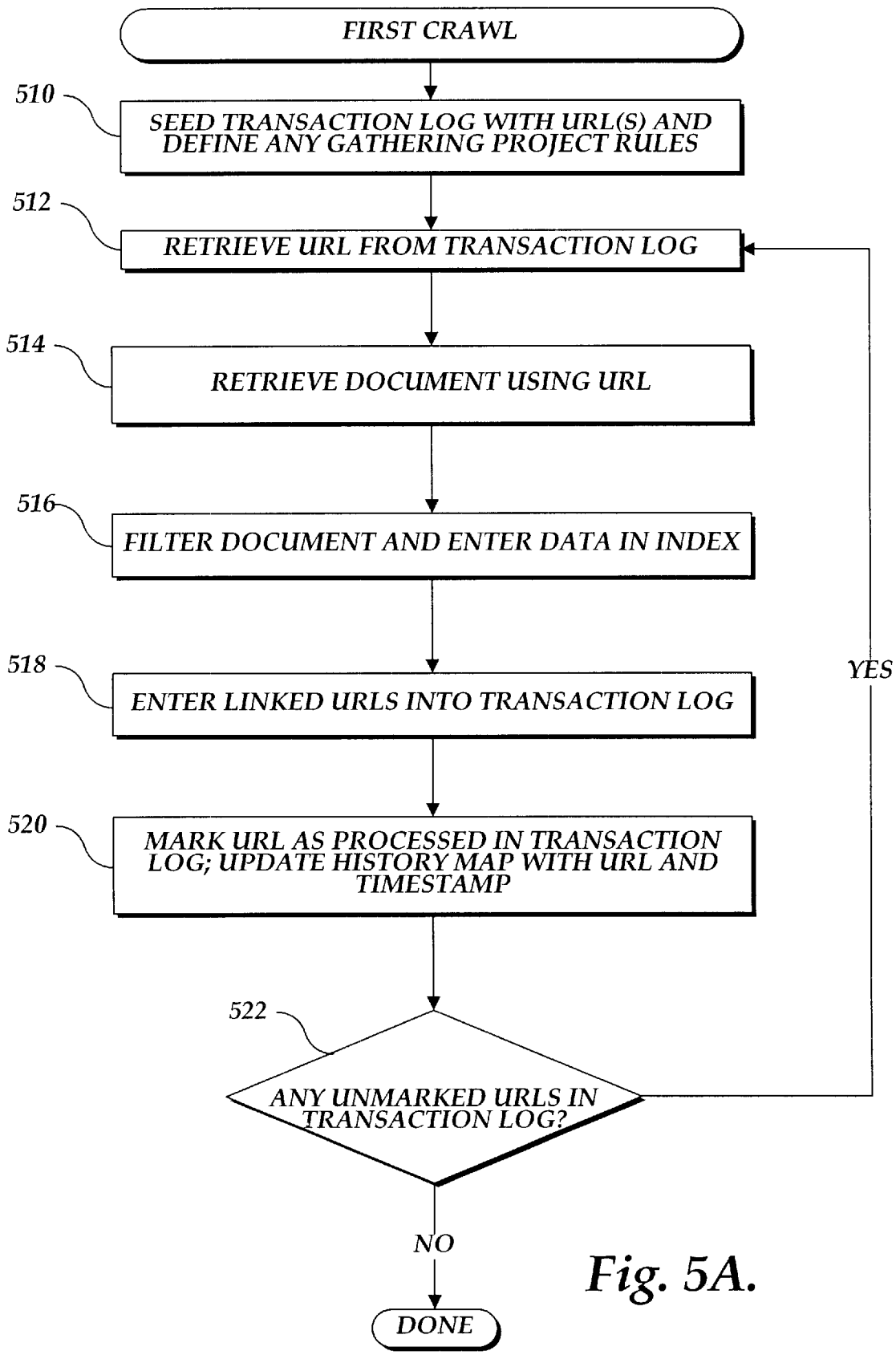
FIGS. 5A and 5B are functional flows diagram illustrating two types of initialization crawls performed by the present invention.

As illustrated in FIG. 5A, the index 210 is initially created and filled during a first crawl. Crawl projects perform gathering in iterations commonly referred to as crawls. In mathematical terms, a crawl can be defined as breadth-first traversal of a graph, in which each document represents a node in the graph, and links between the nodes correspond to the hyperlinks in the documents. Because of the size of the graph of web documents, it is usually unfeasible and undesirable to gather all documents in the web (or whatever domain). Therefore, crawl projects allow a user to specify crawl restrictions. These restrictions narrow down the URL space covered by the crawl into a subset or a sub-graph of the entire web (URL universe). It is important with respect to this invention to set the crawl restriction rules and start addresses in such a way that the set of documents that is crawled during the first crawl and the initialization crawl will be the same as the set monitored by the notification sources.

As shown in block 510, the first crawl starts by seeding the gatherer transaction log 242 with a set of starting URLs and by specifying crawl restrictions for the gatherer project 206. A worker thread retrieves a URL from the transaction log 242 (block 512) and then retrieves the document (block 514) from the computer network 218 using the filtering process 246. The filtering process 246 returns the document information parsed into data and properties that is then processed (block 516) by the gatherer process 240 or a client application 208 to fill the index 210. URLs contained in the properties of the retrieved Web document 222 are recursively added to the transaction log (block 518) so that these "linked" documents will also be visited by the gatherer process 240 during the course of the Web crawl. The gatherer process 240 then marks the Web document's URL a processed in the transaction log 242 and enters the Web document's URL and timestamp in the history map 244. See block 520. The web crawl continues until a decision block 522 determines that all the URLs in the transaction log 242 have been processed. The first crawl shown in FIG. 5a creates a new data store that is synchronized with the Web documents that it was created from because the Web documents 222 and 224 are being monitored from the time they were last retrieved by the notification source 250.

The initialization crawl shown in FIG. 5B is a refinement of the first crawl just discussed (FIG. 5A). Instead of creating an entirely new index 210 as is done in the full initialization crawl (FIG. 5A), the initialization crawl updates the index 210 to reestablish synchronization with the Web documents 222, 224 that were gathered during the first crawl, a previous initialization crawl, or during a previous notification retrieval mode. In a block 550, the transaction log 242 for the initialization crawl is seeded by copying to it the URLs from the history map 244 of Web documents 222, 224 previously visited. Alternatively, when the gatherer project 206 is configured to accept notifications from multiple notification sources, the incremental initialization crawl can be limited to visiting only documents that are monitored by a particular notification source by copying only those URLs in the history map 244 that are associated with electronic documents that are monitored by the notification source 242 that sent the message.

A worker thread retrieves a URL from the transaction log 242 (block 552). The worker threaded then checks, in a decision block 554, to set if the URL is in the history map. (Although the transaction log 242 is seeded with the history map entries, it is possible that a linked URL that was added from a retrieved Web document in a block 562 may not have been previously visited by the gatherer process 241). If the URL is in the history map 244, a decision block 556 compares the timestamp recorded in the history map under the URL associated with the document 222 with the timestamp of the document 222 on the server 218. A different (later) timestamp indicates that the document has been modified since the last time that the document 222 was retrieved and so the gatherer process 240 retrieves the Web document associated with the URL (block 558).

The retrieved document data is filtered and updated in the index 210. See block 560. The filtered document data may also contain hyperlinks specifying URLs of linked documents. These URLs are recursively added to the transaction log 242 (block 562). The retrieved Web document 222 is then marked as processed and a corresponding entry is made (or updated) in the history map that stores the documents URL and timestamp. See block 564. Preferably, when the timestamps are found to differ, the document 222 is retrieved using a conditional retrieval method such as the HTTP "Get If-Modified-Since" command.

As noted above, the retrieval of an electronic document is conditioned upon receipt of an indication that the electronic document has been modified, which is based upon the timestamp of the electronic document. More specifically, as discussed above, the history map is persistent across crawls and system shutdowns. A history map entry includes a timestamp of the electronic document. When an electronic document is retrieved using the HTTP protocol, the Web server reads the timestamp that indicates the most recent time at which the electronic document has been modified. When a history map entry for the document is created, the timestamp is stored in the entry.

In one actual embodiment of the invention, when an electronic document is retrieved (block 558) using the HTTP protocol, an HTTP "Get If-Modified-Since" command is sent from the gatherer process 240 to the Web server 218 addressed by the URL. This command includes a specification of a timestamp. The Web server 218 receiving this command compares the received timestamp with the timestamp of the corresponding electronic document on the Web server. The Web server transmits the corresponding electronic document to the Web crawler only if a comparison of the timestamps indicates that the electronic document has been updated since the date and time specified by the received timestamp. Some Web servers do not support the HTTP "Get If-Modified-Since" command, and always transfer an electronic document in response to this command. Therefore, receiving a new electronic document at step 558 does not guarantee that the retrieved document has a more recent timestamp. However, processing continues at block 560, based on the assumption that the newly retrieved electronic document may have a more recent timestamp.

Similarly, when the FILE protocol is used to retrieve an electronic document, file system attributes are used to determine whether the electronic document has a file date more recent than the timestamp stored in the history map 244. A similar determination is made when other protocols are used to retrieve an electronic document.

If the timestamps associated with the URL that is stored in the history map is equal to the timestamp on the Web document located on the serve 218, the Web document 222 is assumed by the gatherer process 240 to be unchanged. The gatherer process skips to the block 564, where the URL is marked as processed and the history map is updated. The crawl continues in this manner until a decision is made (block 566) that all of the URLs listed in the transaction log 242 have been processed during the current crawl. In the case of a systems failure or shutdown of the computer running either the gatherer process 240 or the notification source 250, the incremental initialization crawl provides an efficient method of resynchronizing the index 210 with the Web documents 222, 224 monitored by the notification source 250.

FIG. 6 illustrates the notification retrieval mode performed by the gatherer process 240 in accordance with the present invention. The notification retrieval mode maintains the accuracy of the index 210 by receiving only those documents 222, 224 that have URLs that were inserted into the notification log 243 as a result of a message sent by a notification source 250 that a Web document 222, 224 has changed. A worker thread retrieves the URL from the notification log 243 (block 612) and then retrieves the Web document 222 (block 614). The document 222 is filtered and the data is entered or updated in the index 210. See block 616. The URL is marked as processed in the notification log 243 and the entry it the history map is then updated with the document's URL and timestamp (block 620).

In the notification retrieval mode, the gatherer process 240 retrieves the documents from the URLs that are asynchronously entered into the notification log 243. A decision block 622 causes the processing of the URLs in the notification log 243 to continue until all the URLs have been processed. After all URLs in the transaction log have been processed, the notification retrieval mode waits for additional URLs to be inserted in the notification log 243.

In an actual embodiment, the method and system of the present invention is realized using an object-oriented programming paradigm. An object-oriented programming paradigm views blocks of computer-executable instructions and data as a collection of discrete objects that interact with other objects. One of the primary benefits of object-oriented programming is that the objects can easily and affordably be adapted to meet new needs by combining them in a modular fashion. An object is a unit of code comprising both routines and data (also called methods and properties) and is thought of as a discrete entry. The structural foundation for an object-oriented language in the object model. The goals of this model are encapsulation, persistence, polymorphism, abstraction, concurrency, and typing. The component object model (COM), the distributed component object model (DCOM), and object linking and embedding (OLE) produced by Microsoft Corporation of Redmond, Wash., are examples of object models. The present invention may be practiced under any of these object models or many others that are well known to those skilled in the art.

Objects communicate with each other through interfaces. Each object may have multiple interfaces. An interface exposes and defines access to the object's public properties and methods. For instance, in Microsoft's COM, all objects are required to support the IUnknown interface. The IUnknown interface includes a method named QueryInterface through which other objects in the global namespace (or a distributed namespace in a distributed system) can request and receive pointers to the objects' other interfaces. One of the primary advantages to interfaces is that a client object can continue to access the methods of a server object that are exposed through the interface regardless of whether the underlying code in the object is updated or changed for another reason.

Figure 7:
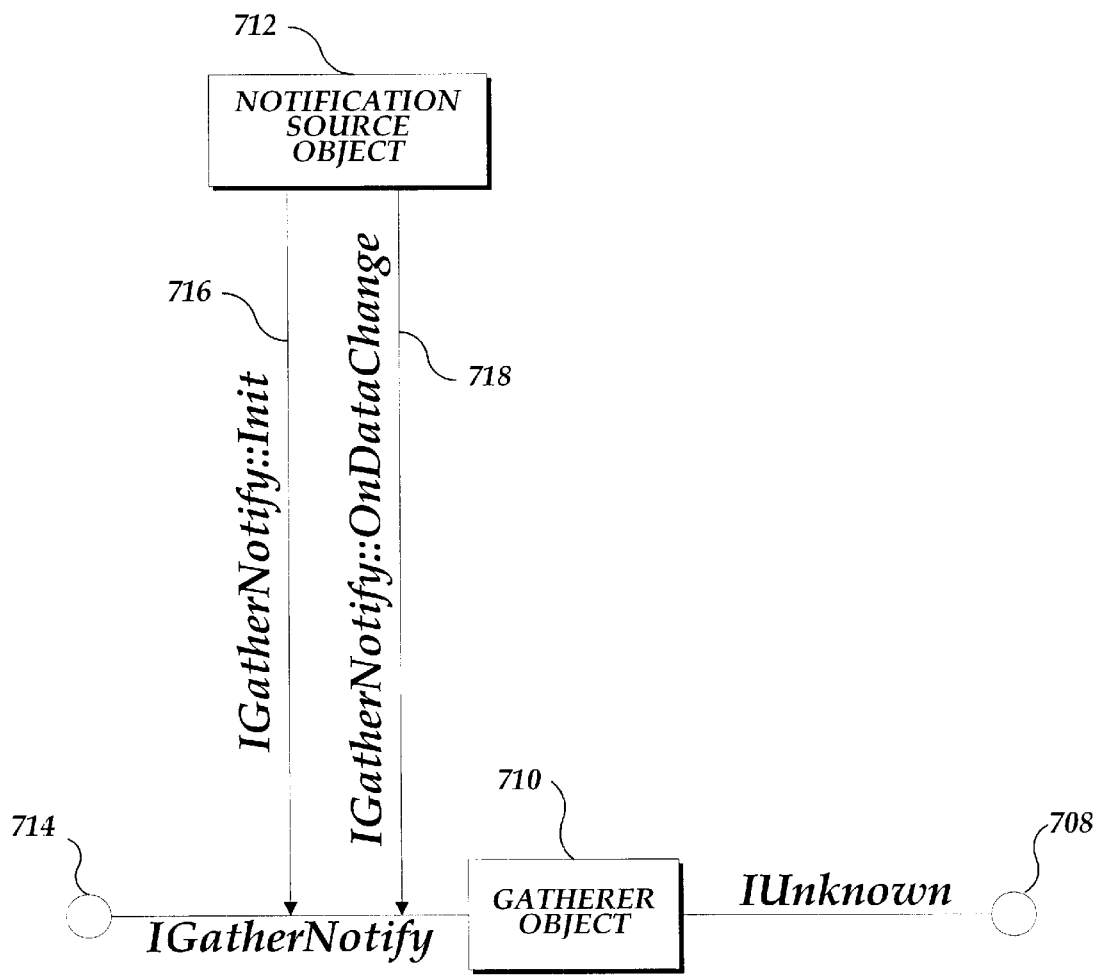
FIG. 7 is a block diagram illustrating the objects and some of the interface exposed by the objects in an actual embodiment of the present invention.

An actual embodiment of the present invention is comprised of a plurality of objects that can communicate with each other through defined interfaces that can be accessed through pointers obtained from the IUnknown interface 708. The interfaces defined by the present invention are discussed in detail below with reference to FIG. 7. Because the gatherer object 710 modeled as an object, multiple independent instances of the gatherer object 710 can be created. Similarly the notification source can be modeled as an object 712, which would allow a number of notification source objects to be instantiated on one or more computers with each notification source objects 712 responsible for monitoring a particular group of documents 222, 224. Similarly, a single notification source object 712 could be instanced on a number of Web servers to watch a scope of documents that could be, for instance, a tree in the file system hierarchy, message how, database or a table. While less desirable, a notification source object 712 could monitor documents on a different server from the one that the notification source object 712 is running on. The invention does not require that the notification source be modeled as an object, expose any interfaces, or conform in COM.

The notification source 712 communicates with the gatherer object 710 through the gatherer object's IGatherNotify interface 714. The notification source object 712 request an initialization crawl (FIG. 5B) by calling the IGatherNotify Init method 716 of the gatherer object 710 (see block 310). The notification source object 712 notifies the gatherer object of documents that have changed by invoking the IGatherNotify::OnDataChange method 718 (see block 322).

While the preferred embodiment of the invention has been illustrated and described it will be appreciated that various changes can be made therein without departing from the spirit and scope of the invention as defined by the appended claims.

The embodiments of the invention in which an exclusive property or privilege is claimed are defined as follows:

1. A computer-based method of retrieving and maintaining information above electronic documents stored on a computer network, each electronic document having an associated document address specification, the method comprising:

(a) retrieving information about selected electronic documents, including their document address specification, from the computer network, for each selected document the retrieving including:
  (i) adding the associated document address specification to a transaction log;
  (ii) returning a copy of the electronic document and marking the document address specification in the transaction log;
  (iii) parsing the returned electronic copy to identify links to other electronic documents having document address specifications;
  (iv) adding the document address specifications of the other electronic documents to the transaction log unless previously in the transaction log; and
  (v) repeating (ii)–(iv) until there are no unmarked document address specifications in the transaction log;

(b) storing at least some of the data associated with each returned electronic document copy in a data store, the document address specification being associated with the data for retrieval of the data from the data store;

(c) providing a notification source for monitoring the document address specification corresponding to each returned electronic document copy for a change made to the electronic document associated with the document address specification;

(d) sending a notification message from the notification source when the monitoring by a notification source detects a change in the electronic document data associated with the document address specification;

(e) processing the notification message so as to cause an electronic document copy containing the detected changes to be returned; and (f) updating at least some of the data associated with the returned electronic copy in the data store based on the returned electronic document copy containing the detected changes.

2. The method of claim 1, further comprising:
synchronizing the notification source with the data store, the notification source and the data store being synchronized when the at least some of the data associated with each returned electronic document copy stored in the data store corresponds to the returned electronic document.

3. The method of claim 2, wherein synchronizing the notification source with the data store includes performing an initialization crawl, the initialization crawl comprising:
(a) seeding the transaction log with at least one document address specification;
(b) iteratively retrieving document address specifications from the transaction log; and
(c) processing each documents address specification retrieved from the transaction log, the processing comprising:
  (i) retrieving an electronic copy of the electronic document data associated with the document address specification; and
  (ii) updating the data store with the electronic copy of the electronic document data.

4. The method of claim 3, wherein the initialization crawl is invoked when the method is first instanced.

5. The method of claim 3, wherein the initialization crawl is invoked by the notification source when the notification source sends an initialization message.

6. The method of claim 5, wherein the initialization message is sent by the notification source when the notification source is first instanced.

7. The method of claim 5, wherein the initialization message is sent by the notification source after the notification source experiences a discontinuity.

8. The method of claim 3, wherein the initialization crawl is a first crawl, the first crawl further comprising creating a new instance of the data store for us during the first crawl.

9. The method of claim 3, wherein the transaction log is seeded with document address specifications monitored by the notification source.

10. The method of claim 3, wherein the transaction log is seeded with a set of document address specifications stored in a history map, the history map comprising a list of document address specifications associated with data associated with returned electronic document copies stored in the data store; and wherein the initialization crawl also comprises:

determining if a timestamp associated with each electronic document copy associated with a document address specification matches the data associated with the electronic document copy;

if the electronic document copy does not have a timestamp that matches the timestamp associated with the electronic document data associated with the electronic document copy returning the electronic document data; and if the electronic document copy has a timestamp that matches the timestamp associated with the electronic document data associated with the electronic copy, not returning the electronic document data.

11. The method of claim 12, wherein the initialization crawl is performed in response to an initialize message sent by the notification source.

12. The method of claim 3, wherein the notification messages are continuously processed from a time immediately following the initialization crawl until the initialization crawl ends.

13. The method of claim 1, wherein the notification source monitors a plurality of electronic documents.

14. A computer-based system for retrieving and maintaining information associated with a plurality of electronic documents stored on a computer network, the system comprising:

(a) a gatherer for performing an initialization crawl, said initialization crawl comprising:
  (i) adding a document address specification to a transaction log;
  (ii) retrieving a copy of a source electronic document from a location on the computer network, the location of the source electronic document defined by a document address specification currently in the transaction log and marking the document address specification in the transaction log;
  (iii) parsing the retrieved source electronic document to identify links to other source electronic documents having document address specifications;
  (iv) adding the document address specifications of the other source electronic documents to the transaction log unless previously in the transaction log;
  (v) storing at least some of an original information content from the copy of the source electronic document in a data store;

(vi) associating the original information content that is stored in the data store with the document address specification of the source electronic document; and (vii) repeating (ii)–(vi) until there are no unmarked document address specifications in the transaction log;

(b) a notification source for monitoring the source electronic document stored at a document address specification, said monitoring the source electronic document comprising:

(i) detecting when a change has been made to the original information content of the source electronic document; and (ii) sending a notification message to the gatherer when the notification source detects that the source electronic document has been changed, the notification message including the document address specification of the source electronic document that has been changed; and (c) said notification retrieval being performed by said gatherer when said gatherer receives a notification message, said notification retrieval comprising:

(i) retrieving a second copy of the source electronic document from a location on said computer networks;

(ii) updating at least some of the original information content in the data store based on the retrieved second copy of the source electronic document; and (iii) maintaining the association of the updated original information contained in the data store with the document address specification of the source electronic document.

15. The system of claim 14, wherein the notification message includes a plurality of document address specifications associated with corresponding monitored documents that the notification source has detected have been changed.

16. The system of claim 14, wherein the notification source and the gatherer operate on different computers connected to the computer network.

17. The system of claim 14, wherein the notification source and the gatherer operate on the same computer.

18. A computer readable medium having computer-executable instructions for retrieving and maintaining information about electronic documents stored on a computer network, each electronic document having an associated document address specification, comprising:

(a) performing an initialization crawl, the initialization crawl comprising:

(i) adding a document address specification to a transaction log;

(ii) returning a copy of the electronic document associated with the document address specification and marking the document address specification in the transaction log;

(iii) parsing the returned electronic document copy to identify links to other electronic documents having document address specifications;

(iv) adding the document address specifications of the other electronic documents to the transaction log unless previously in the transaction log; and (v) repeating (ii)–(iv) until there are not unmarked document address specifications in the transaction log;

(b) monitoring with a notification source the electronic documents associated with said document address specifications for a change to the electronic document;

(c) sending a notification message from the notification source when an electronic document has changed; and (d) performing a notification retrieval inn response to the notification message, the notification retrieval comprising retrieving a new copy of the electronic document from the computer network.

19. The computer-readable medium containing computer-executable instructions for retrieving information from a computer network of claim 18, wherein a plurality of electronic documents are monitored at each electronic document's location on the computer network.

20. The computer-readable medium containing computer-executable instructions for retrieving information from a computer network of claim 19, further comprising:

storing the associated information content of the electronic document in a data store.

21. The computer-readable medium containing computer-executable instructions for retrieving information from a computer network of claim 20, further comprising:

updating the associated information content of the electronic document in the data store with the information content derived from the new copy of the electronic document.

22. A computer-based system for retrieving and maintaining information about electronic documents stored on a computer network, each of said electronic documents having a documents address specification, the system comprising:

(a) means for performing an initialization crawl including:

(i) means for adding a document address specification to a transaction log;

(ii) means for returning a copy of the electronic document associated with the document address specification and marking the document address specification in the transaction log;

(iii) means for parsing the returned electronic document copy to identify links to other electronic documents having document address specifications;

(iv) means for adding the document address specifications of the other electronic documents to the transaction log unless previously in the transaction log; and (v) means for repeating (ii)–(iv) until there are no unmarked document address specifications in the transaction log;

(b) means for detecting changes in the electronic documents associated with said document address specifications; and (c) means for performing an notification retrieval in response to the detection of a change in an electronic document, the notification retrieval comprising retrieving a new copy of the electronic document from the computer network.

23. The computer-based system of claim 22, further comprising:

means for storing information associated with retrieved electronic documents in a data store; and means for updating the associated information stored in the data store based on information contained in the retrieved new copy of the electronic document.

24. The computer-based system of claim 23, wherein the initialization crawl is performed in response to a request made by the means for detecting a change in the electronic documents when the means for detecting a change in the electronic documents first begins to operate.

25. The computer-based system of claim 23, wherein the initialization crawl is performed in response to a request made by the means for detecting a change in the electronic documents when the means for detecting a change in the electronic documents experiences a discontinuity.

* * * * *

UNITED STATES PATENT AND TRADEMARK OFFICE
CERTIFICATE OF CORRECTION

PATENT NO.    : 6,424,966 B1
DATED         : July 23, 2002
INVENTOR(S)   : D. Meyerzon et al.

It is certified that error appears in the above-identified patent and that said Letters Patent is hereby corrected as shown below:

Column 1,
Line 16, "typically accept" should read -- typically accepts --
Line 17, "and obtain" should read -- and obtains --
Line 31, "Web serves" should read -- Web server --
Line 34, "formating" should read -- formatting --
Line 38, "may represents" should read -- may represent --
Line 47, "containing serves" should read -- containing server --

Column 2,
Line 28, "inks," should read -- links, --
Line 33, "monitor the data" should read -- which monitor the data --
Line 36, "necessary, the" should read -- necessary, by --
Line 39, "the gather" should read -- the gatherer --

Column 3,
Line 17, "experiences of" should read -- experiences a --
Line 34, "may (discovered" should read -- map (discovered --
Lines 35-36, "times-
            tamp" should break
         -- time
            stamp --
Line 42, "to by unchanged" should read -- to be unchanged --

Column 4,
Line 5, "does not used" should read -- does not need --
Line 24, "block illustrating" should read -- block diagram illustrating --
Line 31, "flows diagram" should read -- flow diagrams --
Line 38, "of the interface" should read -- of the interfaces --
Line 49, "(the "Web")." should read -- (the "Web"). --

Column 5,
Line 15, "has retrieved any" should read -- last retrieved and --
Line 19, "documents n" should read -- documents in --
Line 48, "gather" should read -- gatherer --

UNITED STATES PATENT AND TRADEMARK OFFICE
CERTIFICATE OF CORRECTION

PATENT NO.    : 6,424,966 B1
DATED         : July 23, 2002
INVENTOR(S)   : D. Meyerzon et al.

It is certified that error appears in the above-identified patent and that said Letters Patent is hereby corrected as shown below:

Column 6,
Line 10, "thee" should read -- there --
Line 30, "etc. hat" should read -- etc., that --
Line 40, "competing" should read -- computing --
Line 45, "in the from" should read -- in the form --
Line 53, "(RMA)" should read -- (RAM) --

Column 7,
Line 10, "(ROM)," should read -- (ROMs), --
Line 16, "user only enter" should read -- user may enter --
Line 36, "pear device" should read -- peer device --
Line 42, "(WAN) 52, Such" should read -- (WAN) 52. Such --

Column 8,
Line 1, "remote-computers," should read -- remote computers, --
Line 18, "appreciated" should read -- appreciate --
Line 23, "illustrates" should read -- illustrate --
Line 29, "keyboards," should read -- keywords, --
Line 30, "keyboard" should read -- keyword --
Line 38, "which have" should read -- which has --
Line 49, "a "browse" 215" should read -- a "browser" 215 --
Line 62, "remote computes" should read -- remote computers --

Column 9,
Line 14, "gathered. Web" should read -- gathered Web --

Column 10,
Line 30, "(FIG. 5*b*)" should read -- (FIG. 5B) --
Line 34, "discontinously--which" should read -- discontinuity--which --

Column 11,
Line 11, "list of notification" should read -- list of notifications --
Line 53, "scored" should read -- stored --
Line 55, "file notification" should read -- file notifications --

Column 12,
Line 17, "has trigger" should read -- has a trigger --
Line 36, "more notification source" should read -- more notification sources --
Line 37, "a synchronous" should read -- asynchronous --
Line 47, "trough" should read -- through --
Line 58, "message 322" should read -- message 322, --

UNITED STATES PATENT AND TRADEMARK OFFICE
CERTIFICATE OF CORRECTION

PATENT NO.   : 6,424,966 B1
DATED        : July 23, 2002
INVENTOR(S)  : D. Meyerzon et al.

It is certified that error appears in the above-identified patent and that said Letters Patent is hereby corrected as shown below:

Column 13,
Line 3, "UR1" should read -- URL --

Column 14,
Line 1, "a processed" should read -- as processed --
Line 5, "FIG. 5*a*" should read -- FIG. 5A --
Line 28, "worker threaded" should read -- worker thread --
Line 33, "process 241)." should read -- process 240). --
Lines 36-37, "times-
            tamp" should break -- time-
            stamp --
Line 49, "stores the documents" should read -- stores the document's --

Column 15,
Lines 5-6, "times-
          tamp" should break -- time
          stamp --
Line 27, "serve 218," should read --server 218, --
Line 53, "entry it" should read -- entry in --

Column 16,
Line 40, "objects 712" should read -- object 712 --
Line 50, "in COM." should read -- to COM. --
Line 53, "request an" should read -- requests an --
Line 55, "Init" should read -- ::Init --
Line 60, "described it" should read -- described, it --
Line 67, "above" should read -- about --

Column 17,
Line 58, "documents address" should read -- document address --

Column 18,
Line 12, "us" should read -- use --
Lines 27-28, "times-
            tamp" should break -- time-
            stamp --
Line 36, "claim 12," should read -- claim 10, --

UNITED STATES PATENT AND TRADEMARK OFFICE
CERTIFICATE OF CORRECTION

PATENT NO.    : 6,424,966 B1
DATED         : July 23, 2002
INVENTOR(S)   : D. Meyerzon et al.

It is certified that error appears in the above-identified patent and that said Letters Patent is hereby corrected as shown below:

Column 19,
Line 39, "computer readable" should read -- computer-readable --
Line 58, "there are not" should read -- there are no --
Line 66, "inn" should read -- in --

Column 20,
Line 24, "a documents address" should read -- a document address --
Line 44, "performing an notification" should read -- performing a notification --

Signed and Sealed this

First Day of July, 2003

JAMES E. ROGAN
*Director of the United States Patent and Trademark Office*